(12) United States Patent
Okita et al.

(10) Patent No.: US 7,037,067 B2
(45) Date of Patent: May 2, 2006

(54) GAS TURBINE ENGINE (75) Inventors: Yoji Okita, Tokyo (JP); Shigemichi Yamawaki, Tokyo (JP)

(73) Assignee: Inhikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 10/508,842

(22) PCT Filed: Mar. 5, 2003

(86) PCT No.: PCT/JP03/02556

§ 371 (c)(1),
(2), (4) Date: Sep. 23, 2004

(87) PCT Pub. No.: WO2004/070171

PCT Pub. Date: Aug. 19, 2004

(65) Prior Publication Data

US 2005/0163608 A1 Jul. 28, 2005

(30) Foreign Application Priority Data

Feb. 5, 2003 (JP) ............... 2003-028128

(51) Int. Cl.
*F01D 5/08* (2006.01)
(52) U.S. Cl. ..................... 415/115; 416/97 R
(58) Field of Classification Search ........... 415/115; 416/97 R
See application file for complete search history.

(56) References Cited

U.S. PATENT DOCUMENTS

| 2,401,826 | A | * | 6/1946 | Halford .................. 415/115 |
| 2,598,176 | A | * | 5/1952 | Johnstone ............. 416/97 R |
| 2,623,727 | A | * | 12/1952 | McLeod ................ 416/97 R |
| 4,425,079 | A |   | 1/1984 | Speak et al. |
| 5,967,745 | A |   | 10/1999 | Tomita et al. |

FOREIGN PATENT DOCUMENTS

| DE | 199 31 763 | 1/2001 |
| EP | 1 205 634 | 5/2002 |
| JP | 8-296455 | 11/1996 |
| JP | 11-36802 | 2/1999 |
| JP | 2000-204904 | 7/2000 |
| WO | 95/30071 | 11/1995 |

* cited by examiner

*Primary Examiner*—Edward K. Look
*Assistant Examiner*—Igor Kershteyn
(74) *Attorney, Agent, or Firm*—Oblon, Spivak, McClelland, Maier & Neustadt, P.C.

(57) ABSTRACT

A gas turbine engine includes a front cooling plate provided on a front stationary section in the vicinity of a front side of a turbine disc, a front cooling passage formed between an opposing surface of the front cooling plate and a front surface of a rim of the turbine disc, a rear cooling plate provided on a rear stationary section in the vicinity of a rear side of the turbine disc, and a rear cooling passage formed between an opposing surface of the rear cooling plate and a rear surface of the rim of the turbine disc.

7 Claims, 6 Drawing Sheets

GAS TURBINE ENGINE

TECHNICAL FIELD

The present invention relates to a gas turbine engine such as a jet engine capable of obtaining rotation force from a turbine by operating the turbine by means of expansion of a combustion gas or capable of obtaining propulsion by injecting combustion gas injected from the turbine.

BACKGROUND ART

Japanese Patent Application Laid-open No. Hei8-296455 (laid open in 1996) discloses a conventional technique of a jet engine as one example of conventional gas turbine engines. This conventional technique will be briefly explained hereinbelow.

The jet engine includes a fan which takes in air, a compressor which compresses the air taken by the fan, a combustor which burns fuel in the compressed air compressed by the compressor, and a turbine which is operated by expansion of combustion gas from the combustor and which operates the fan and the compressor in association.

Thus, air is taken in by the operation of the fan, and the air is compressed by the operation of the compressor. When the fuel is burned in the compressed air by the combustor, the combustion gas from the combustor is expanded to operate the turbine, and consequently the fan and the compressor are operated by the turbine. Since this series of operations (operation of the fan, operation of the compressor, combustion by the combustor and operation of the turbine) is continuously carried out, the jet engine can appropriately be operated and a rotational force can be obtained from the turbine and propulsion can be obtained by the combustion gas injected from the turbine.

During the operation of the jet engine, excessive centrifugal force is applied to a rim of a turbine disc of the turbine by high speed rotation of the turbine disc. The turbine disc is heated to a high temperature due to the combustion gas from the combustor and allowable stress of the turbine disc is lowered. Thus, in the jet engine, the following structure is employed to sufficiently lower the temperature of the turbine disc.

That is, the rim of the turbine disc is appropriately formed with a plurality of cooling holes in its circumferential direction, and a portion of the compressed air can flows into each cooling hole as cooling air. A stationary section is provided on a front side and near side of the turbine disc. The stationary section is provided with a cooling duct. The cooling duct is in communication with the cooling holes, and the cooling air is introduced into the cooling holes.

During the operation of the jet engine, the cooling air is introduced into the cooling holes by the cooling duct, and flows into the cooling holes. With this structure, the rim of the turbine disc can be cooled and the allowable stress of the turbine disc can be prevented from being lowered.

In case the jet engine is allowed to operate in a high output state, however, the rotational speed of the turbine disc is increased and a large amount of combustion gas is entrained toward a center of the disc from the rim of the turbine disc. Thus, the flow rate of the cooling air which flows into the cooling passage is increased and it is necessary to sufficiently cool the turbine disc. On the one hand, the turbine disc is sufficiently cooled, however, the consumed flow rate of the cooling air is increased to generate energy loss, and the energy efficiency of the jet engine is deteriorated.

The present invention has been achieved in order to solve the above problem, and it is a first object of the invention to provide a gas turbine engine capable of operating in a high output state by preventing the energy efficiency from being deteriorated.

It is a second object of the invention to provide a gas turbine engine capable of sufficiently preventing the combustion gas from being entrained toward the center of the turbine disc only by flowing the cooling air of small flow rate.

DISCLOSURE OF THE INVENTION

In order to achieve the above object, a gas turbine engine according to a first aspect of the present invention comprises: a compressor which compresses air; a combustor which burns fuel in the compressed air compressed by the compressor; a turbine which is operated by expansion of combustion gas from the combustor and which operates the compressor in association; and a cooling plate which is provided on a stationary section in the vicinity of a turbine disc in the turbine, and which extends in a radial direction of the turbine disc such as to be opposed to a side surface of a rim of the turbine disc such that the opposing surface of the cooling plate is close to the side surface of the rim, and a cooling passage into which a portion of the compressed air can flow as cooling air is formed between the opposing surface of the cooling plate and the side surface of the rim.

According to the first aspect of the present invention, the compressor is operated to compress the air. When fuel is allowed to burn in the compressed air, combustion gas from the combustor expands to operate the turbine, and the turbine operates the compressor in association. By continuously carrying out the series of operations (operation of the compressor, combustion by the combustor, and operation of the turbine), the gas turbine engine can appropriately be operated, the rotational force can be obtained from the turbine and propulsion can be obtained by the combustion gas injected from the turbine.

During the operation of the gas turbine, the cooling air flows into the cooling passage and is discharged toward the main passage. Here, the cooling plate extends in the radial direction of the disc such as to be opposed to the side surface of the rim, and the opposing surface of the cooling plate is close to the side surface of the rim. Therefore, a circulating cooling air flow layer having high cooling effect is formed in the cooling passage. With this configuration, it is possible to sufficiently suppress the combustion gas from being entangled toward the center of the disc from the rim side only by flowing a small amount of cooling air into the cooling passage.

Therefore, the consumption amount of cooling air required for cooling the entire turbine disc can be reduced, and the jet engine can be operated in the high output state while suppressing the reduction of the energy efficiency of the gas turbine engine.

A second aspect of the present invention provides the gas turbine engine according to the first aspect, wherein the opposing surface of the cooling plate is substantially parallel to the side surface of the rim.

According to the second aspect of the present invention, since the opposing surface of the cooling plate is substantially parallel to the side surface of the rim, the circulating cooling air flow layer having a higher cooling effect can be formed in the cooling passage.

Accordingly, the effect is further enhanced.

A gas turbine engine according to a third aspect of the present invention comprises: a compressor which compresses air; a combustor which burns fuel in the compressed air compressed by the compressor; a turbine which is operated by expansion of combustion gas from the combustor and which operates the compressor in association; a front cooling plate which is provided on a front stationary section in the vicinity of a front side of a turbine disc in the turbine;

a cooling plate which is provided on a front stationary section in the vicinity of a turbine disc in the turbine, and which extends in a radial direction of the turbine disc such as to be opposed to a front surface of a rim of the turbine disc such that the opposing surface of the cooling plate is close to the front surface of the rim;

a front cooling passage which is formed between the opposing surface of the front cooling plate and the front surface of the rim, and into which a portion of compressed air as cooling air can flow;

a rear cooling plate which is provided on a rear stationary section in the vicinity of a rear side of the turbine disc and which extends in a radial direction of the disc such as to be opposed to a rear surface of the rim such that the opposing surface of the rear cooling plate is close to the rear surface of the rim; and a rear cooling passage which is formed between the opposing surface of the rear cooling plate and the rear surface of the rim, and into which a portion of the compressed air as the cooling air can flow.

According to the third aspect of the present invention, the compressor is operated to compress the air. If fuel is allowed to burn in the compressed air, combustion gas from the combustor expands to operate the turbine, and the turbine operates the compressor in association therewith. By continuously carrying out the series of operations (operation of the compressor, combustion by the combustor, and operation of the turbine), the gas turbine engine can appropriately be operated, the rotational force can be obtained from the turbine and propulsion can be obtained by the combustion gas injected from the turbine.

During the operation of the gas turbine, the cooling air flows into the cooling passage and is discharged toward the main passage. Here, the front cooling plate extends in the radial direction of the disc such as to be opposed to the front surface of the rim, and the opposing surface of the front cooling plate is close to the front surface of the rim. Therefore, a circulating cooling air flow layer having high cooling effect is formed in the front cooling passage. Similarly, the rear cooling plate extends in the radial direction of the disc such as to be opposed to the rear surface of the rim, and the opposing surface of the rear cooling plate is close to the rear surface of the rim. Therefore, a circulating cooling air flow layer having high cooling effect is formed in the rear cooling passage. With this configuration, it is possible to sufficiently suppress the combustion gas from being entangled toward the center of the disc from the rim side only by flowing a small amount of cooling air into the front and rear cooling passages.

Therefore, the consumption amount of cooling air required for cooling the entire turbine disc can be reduced, and the jet engine can be operated in the high output state while suppressing the reduction of the energy efficiency of the gas turbine engine.

A fourth aspect of the present invention provides the gas turbine engine according to the third aspect, wherein the opposing surface of the front cooling plate is substantially in parallel to the front surface of the rim, and the opposing surface of the rear cooling plate is substantially in parallel to the rear surface of the rim.

According to the fourth aspect of the present invention, since the opposing surface of the front cooling plate is substantially in parallel to the front surface of the rim, the circulating cooling air flow layer having higher cooling effect can be formed in the front cooling passage. Similarly, since the opposing surface of the rear cooling plate is substantially in parallel to the rear surface of the rim, the circulating cooling air flow layer having higher cooling effect can be formed in the rear cooling passage.

Since the circulating cooling air flow layers having higher cooling effect can be formed in the front and rear cooling passages, the effect is further enhanced.

BEST MODE FOR CARRYING OUT THE INVENTION

Figure 1:
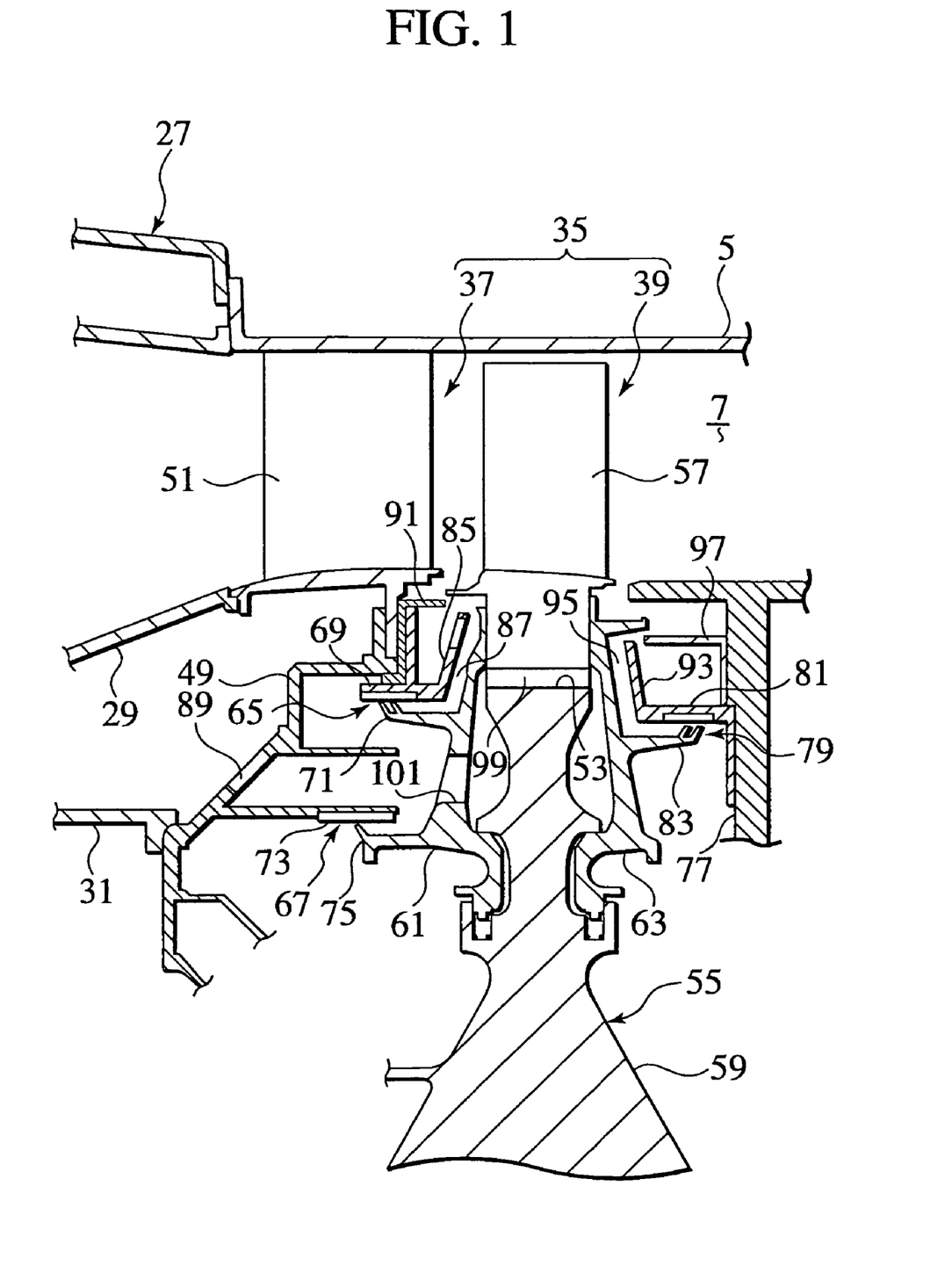
FIG. 1 is an enlarged view of a portion I shown with an arrow in FIG. 2.
Figure 2:
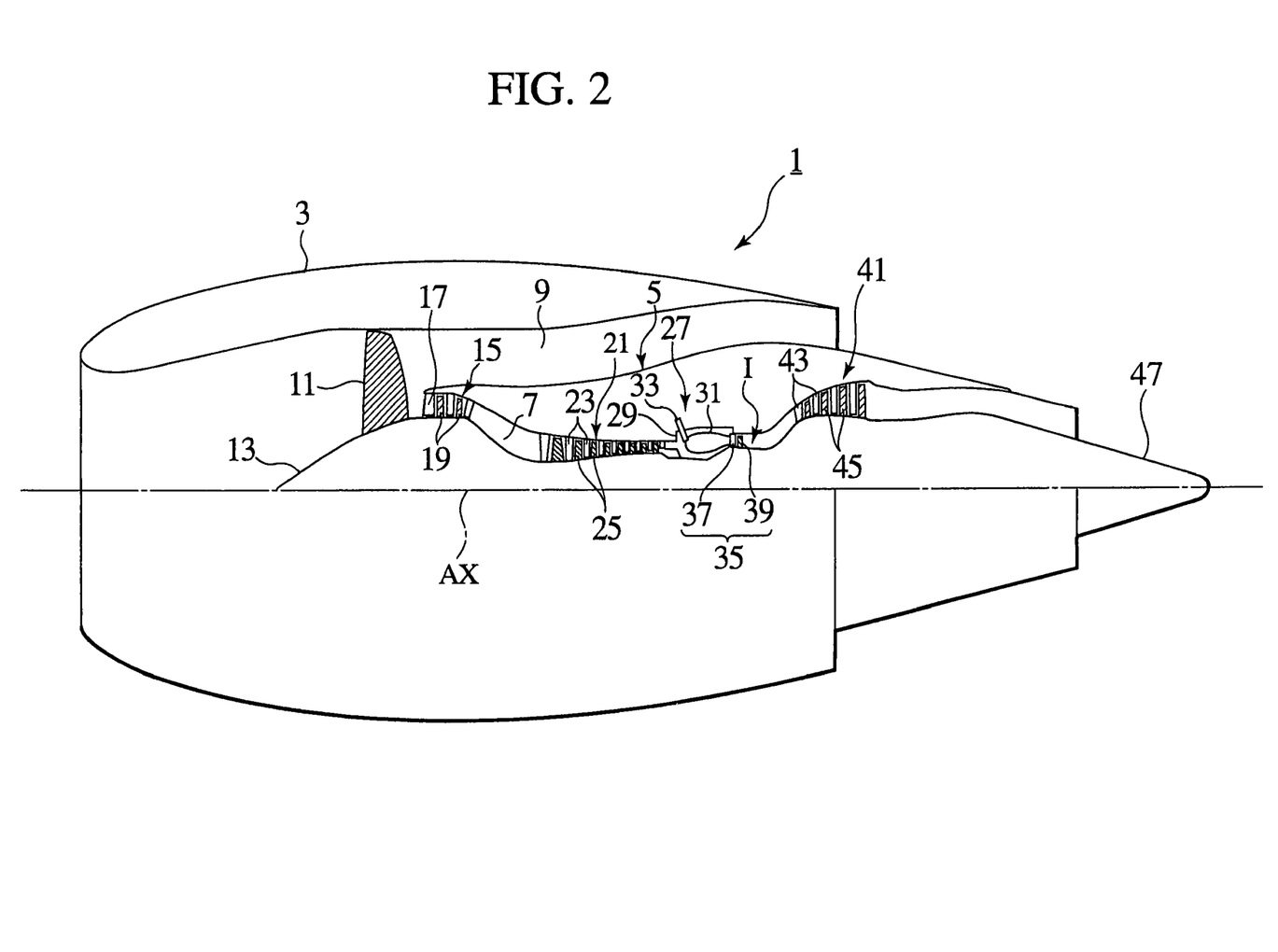
FIG. 2 is a schematic partially sectional view of a jet engine according to an embodiment of the present invention.

Referring now to FIGS. 1 and 2, an embodiment of the present invention will be explained hereinbelow.

FIG. 1 is an enlarged view of a portion I shown with an arrow in FIG. 2, and FIG. 2 is a schematic partially sectional view of a jet engine according to the embodiment of the present invention. Here, the term "front" means "left" in FIGS. 1 and 2, and the term "rear" means "right" in FIGS. 1 and 2.

As shown in FIG. 2, the jet engine (one of gas turbine engines) 1 according to the embodiment of the present invention is used for an aircraft. The jet engine mainly comprises an outer cylinder frame 3 and an inner cylinder frame 5 which is integrally provided inside the outer cylinder frame 3. An annular main passage (core passage) 7 is formed inside the inner cylinder frame 5. An inner bypass passage 9 is formed between an inner side of the outer cylinder frame 3 and an outer side of the inner cylinder frame 5.

A fan 11 is rotatably provided on a front end of the inner cylinder frame 5. The fan 11 takes air into the main passage 7 and the bypass passage 9. The fan 11 is provided at its central portion with an inlet cone 13 which guides the air.

A low-pressure compressor 15 is provided in the inner cylinder frame 5 at the rear side of the fan 11. The low-pressure compressor 15 compresses, under a low pressure, the air which is taken into the main passage 7. The low-pressure compressor 15 includes a plurality of low-pressure compressor stators 17 provided on the inner cylinder frame 5 along a main stream direction (leftward in FIG. 2), and a plurality of low-pressure compressor rotors 19 rotatably provided on the inner cylinder frame 5 along the main stream direction. The low-pressure compressor stators 17 and the low-pressure compressor rotors 19 are alternately disposed, and the low-pressure compressor rotors 19 are integrally connected to the fan 11.

A high-pressure compressor 21 is provided on a rear side of the low-pressure compressor 15 in the inner cylinder frame 5. The high-pressure compressor 21 further compresses, under high pressure, the compressed air which was compressed under low pressure. The high-pressure compressor 21 includes a plurality of high-pressure compressor stators 23 provided on the inner cylinder frame 5 along the main stream direction, and a plurality of high-pressure compressor rotors 25 rotatably provided on the inner cylinder frame 5 along the main stream direction. The high-pressure compressor stators 23 and the high-pressure compressor rotors 25 are alternately disposed.

A combustor 27 is provided on a rear side of the high-pressure compressor 21 in the inner cylinder frame 5. The combustor 27 burns the fuel in the compressed air compressed under high pressure. The combustor 27 includes an annular combustor casing 29 provided on the inner cylinder frame 5, an annular combustor liner 31 provided inside the combustor casing 29, and an injection nozzle 33 provided on the combustor liner 31 for injecting the fuel. An interior of the combustor casing 29 and an interior of the combustor liner 31 form a portion of the main passage 7. The interior of the combustor casing 29 and the interior of the combustor liner 31 are in communication with each other through a plurality of communication holes (not shown).

A high-pressure turbine 35 is provided on a rear side of the combustor 27 in the inner cylinder frame 5. The high-pressure turbine 35 is operated by expansion of the combustion gas from the combustor 27 and operates the high-pressure compressor 21 in association. The high-pressure turbine 35 includes a high-pressure turbine stator 37 provided on the inner cylinder frame 5, and a high-pressure turbine rotor 39 rotatably provided in the inner cylinder frame 5. The high-pressure turbine rotor 39 is integrally connected to the high-pressure compressor rotors 25 through a high-pressure turbine shaft (not shown), so that when the high-pressure turbine 35 is operated, the high-pressure compressor 21 can be operated in association.

A low-pressure turbine 41 is provided on the rear side of the high-pressure turbine 35 in the inner cylinder frame 5. The low-pressure turbine 41 is operated by expansion of the combustion gas and operates the low-pressure compressor 15 and the fan 11 in association. The low-pressure turbine 41 includes a plurality of low-pressure turbine stators 43 provided on the inner cylinder frame 5 along the main stream direction, and a plurality of low-pressure turbine rotors 45 rotatably provided on the inner cylinder frame 5. The low-pressure turbine stators 43 and the low-pressure turbine rotors 45 are alternately disposed. The low-pressure turbine rotors 45 are integrally connected to the low-pressure compressor rotors 19 through a low-pressure turbine shaft (not shown), so that when the low-pressure turbine 41 is operated, the low-pressure compressor 15 and the fan 11 can be operated in association.

A tail cone 47 is provided at the rear end of the inner cylinder frame 5. The tail cone 47 guides the combustion gas injected from the low-pressure turbine 41 in the main passage 7. Consequently, the combustion gas injected from the main passage 7 is enveloped in a cylindrical configuration by air injected from the bypass passage 9.

Continuously, a specific structure of the high-pressure turbine 35 which is an essential portion of the embodiment of the present invention will be explained.

As shown in FIG. 1, the high-pressure turbine stator 37 which is a constituent element of the high-pressure turbine 35 comprises a blade support member 49 fixed to the inner cylinder frame 5, and a large number of turbine stationary blades 51 (only one of them is shown in the drawing) provided on the blade support member 49 at equal distances from one another in the circumferential direction.

A high-pressure turbine rotor 39 which is a constituent element of the high-pressure turbine 35 comprises a turbine disc 55 which is rotatably provided in the inner cylinder frame 5 and which is provided at its rim with a large number of notches 53, and a large number of turbine moving blades 57 (only one of them is shown in the drawing) which are fitted to the notches 53 of the turbine disc 55. Furthermore, the turbine disc 55 comprises an annular disc body 59 having a large number of notches 53, an annular front seal 61 which is provided on a front side of the disc body 59 and which holds the turbine moving blades 57 so as not to move forward, and a rear seal 63 which is provided on a rear side of the disc body 59 and which holds the turbine moving blades 57 so as not to move rearward.

The turbine disc 55 is heated to a high temperature due to the combustion gas from the combustor 27. Therefore, in this embodiment of the invention, the following configuration is employed to sufficiently lower the temperature of the turbine disc 55 and the like.

Namely, two front labyrinth seals 65 and 67 are interposed between the high-pressure turbine stator 37 and the high-pressure turbine rotor 39. The front labyrinth seals 65 and 67 prevent the combustion gas from flowing on a front side of the turbine disc 55 in the direction from a peripheral portion of the turbine disc 55 toward a center of the turbine disc 55 (center of the engine). The front labyrinth seal 65 includes an annular stationary seal member 69 which is provided on a front side of the turbine disc 55 in the blade support member 49, and an annular moving seal member 71 which is integrally formed with the front seal 61. The front labyrinth seal 67 includes an annular stationary seal member 73 which is provided inside of the stationary seal member 69 in the blade support member 49, and an annular moving seal member 75 which is integrally formed inside of the moving seal member 71 in the front seal 61.

A rear stationary member 77 is provided on a rear side of the turbine disc 55 in the inner cylinder frame 5. A rear labyrinth seal 79 is interposed between the high-pressure turbine rotor 39 and the rear stationary member 77. The rear labyrinth seal 79 prevents the combustion gas from flowing through the rear side of the turbine disc 55 toward the center of the turbine disc 55. The rear labyrinth seal 79 includes an annular stationary seal member 81 provided on a rear side of the turbine disc 55 in the rear stationary member 77, and an annular moving seal member 83 which is integrally formed with the rear seal 63.

Furthermore, labyrinth seals, not shown, other than the labyrinth seals 65, 67, and 79 are appropriately interposed between the high-pressure turbine stator 37 and the high-pressure turbine rotor 39, as well as between the high-pressure turbine rotor 39 and the rear stationary member 77.

The stationary seal member 69 in the front labyrinth seal 65 is integrally formed with an annular front cooling plate 85. The front cooling plate 85 extends in a radial direction of the turbine disc 55 such as to be opposed to a front surface of a rim of the front seal 61 (front surface of the rim of the turbine disc 55). The opposing surface of the front cooling plate 85 is close and substantially parallel to the front surface of the rim of the front seal 61. A front cooling passage 87 is formed between the opposing surface of the front cooling plate 85 and the front surface of the rim of the front seal 61. A portion of the compressed air as cooling air can flow through the front cooling passage 87. The blade support member 49 is provided with a plurality of through holes 89 (only one of them is shown in the drawing) which are arranged in the circumferential direction. The front cooling passage 87 is in communication with an outer portion (one of cooling air sources) of the combustor liner 31 in the combustor casing 29 through the through holes 89 and a fine gap of the front labyrinth seal 65.

Instead of integrally forming the front cooling plate 85 and the stationary seal member 69, the front cooling plate 85 may be provided on a front flange 91 disposed in the vicinity of a front side of the turbine disc 55 in the blade support member 49.

The stationary seal member 81 in the rear labyrinth seal 79 is integrally formed with an annular rear cooling plate 93. The rear cooling plate 93 extends in a radial direction of the turbine disc 55 such as to be opposed to a rear surface of a rim of the rear seal 63 (rear surface of the rim of the turbine disc 55). The opposing surface of the rear cooling plate 93 is close to and is substantially parallel to the rear surface of the rim of the rear seal 63. A rear cooling passage 95 is formed between the opposing surface of the rear cooling plate 93 and the rear surface of the rim of the rear seal 63. A portion of the compressed air as cooling air can flow through the rear cooling passage 95. The rear cooling passage 95 is in communication with an appropriate cooling air source through a fine gap of the rear labyrinth seal 79 or the like.

Instead of integrally forming the rear cooling plate 93 and the stationary seal member 81, the rear cooling plate 93 may be provided on a rear flange 97 disposed in the vicinity of a rear side of the turbine disc 55 in the rear stationary member 77.

The turbine moving blades 57 are configured to have a hollow structure as shown in Japanese Patent Application Laid-open No. 2002-303101. A rear surface of the turbine moving blade 57 is formed with a large number of blowout holes (not shown) which are in communication with an interior of the blade. Communication cooling passages 99 are formed between the turbine moving blades 57 and corresponding notches 53. A portion of the compressed air as cooling air can flow through the communication cooling passage 99. Interiors of the turbine moving blades 57 and the corresponding communication cooling passages 99 are in communication with each other through communicating openings (not shown). Furthermore, the front seal 61 is formed with a plurality of through holes 101 (only one of them is shown in the drawing) in the circumferential direction. The communication cooling passages 99 are in communication with an outer portion of the combustor liner 31 in the combustor casing 29 through the through holes 101 and the through holes 89.

Next, operations of the embodiment according to the present invention will be explained.

First, an appropriate starter device (not shown) is operated to operate the high-pressure compressor 21, thereby rotating plural stages of the high-pressure compressor rotors 25. With this operation, air is compressed by plural stages of the high-pressure compressor stators 23 and the plural stages of the high-pressure compressor rotors 25. With this operation, the jet engine 1 is started. If the rotation number of the high-pressure compressor stators 23 reaches to the predetermined rotation number, the operation of the starter device is stopped.

When the fuel is burned in the compressed air by the combustor 27, the expansion of the combustion gas through the combustor liner 31 operates the high-pressure turbine 35 and the low-pressure turbine 41, thereby rotating plural stages of the high-pressure turbine rotors 39 and of the low-pressure turbine rotors 45. The high-pressure turbine 35 operates the high-pressure compressor 21 in association, thereby rotating the high-pressure compressor rotors 25. The low-pressure turbine 41 operates the low-pressure compressor 15 and the fan 11 in association, thereby integrally rotating the plural stages of the low-pressure compressor rotors 19 and the fan 11. With this operation, air is taken into the main passage 7 and the bypass passage 9 by the operation of the fan 1, and the air is compressed, under low pressure, by the plural stages of the low-pressure compressor stators 17 and of the low-pressure compressor rotors 19, and this air compressed under low pressure is further compressed, under high pressure, by the plural stages of the high-pressure compressor stators 23 and the plural stages of the high-pressure compressor rotors 25.

By continuously carrying out this series of operations (rotation of the fan 11, operation of the low-pressure compressor 15, operation of the high-pressure compressor 21, combustion by the combustor 27, operation of the high-pressure turbine 35, and operation of the low-pressure turbine 41), the jet engine 1 can appropriately be operated, the rotational force can be obtained from the high-pressure turbine 35, and propulsion can be obtained by the combustion gas injected from the low-pressure turbine 41 in the main passage 7. During the operation of the jet engine 1, cold air is injected from the bypass passage 9, and the combustion gas is enveloped by this cold air. Therefore, noise which may be caused by injection of the combustion gas can be suppressed, and the amount of fuel to be consumed can be reduced.

During operation of the jet engine 1, the front labyrinth seals 65 and 67 prevent the combustion gas from passing through the front side of the turbine disc 55 and from flowing toward the center of the turbine disc 55, and the rear labyrinth seal 79 prevents the combustion gas from passing through the rear side of the turbine disc 55 and from flowing toward the center of the turbine disc 55.

During the operation of the jet engine 1, the front labyrinth seals 65 and 67 prevent the combustion gas from passing through the front side of the turbine disc 55 and from flowing toward the center of the turbine disc 55, and the rear labyrinth seal 79 prevents the combustion gas from passing through the rear side of the turbine disc 55 and from flowing toward the center of the turbine disc 55.

Further, the cooling air (a portion of the compressed air) from the outside of the combustor liner 31 in the combustor casing 29 flows into the front cooling passage 87 through the through holes 89 and the fine gap of the front labyrinth seal 65, and the cooling air is discharged toward the main passage 7. The cooling air from the appropriate cooling air source flows into the rear cooling passage 95 through the fine gap of the rear labyrinth seal 79 and is discharged toward the main passage 7. The front cooling plate 85 extends in the radial direction of the disc such as to be opposed to the front surface of the rim of the front seal 61, in a manner such that the opposing surface of the front cooling plate 85 is close to the front surface of the rim of the front seal 61. Therefore, a circulating laminar air flow having high cooling effect is formed in the front cooling passage 87. Similarly, the rear cooling plate 93 extends in the radial direction of the disc such as to be opposed to the rear surface of the rim of the rear seal 63, in a manner such that the opposing surface of the rear cooling plate 93 is close to the rear surface of the rim of the rear seal 63. Therefore, another circulating laminar air flow having high cooling effect is formed in the rear cooling passage 95. With these configurations, it is possible to sufficiently suppressing the combustion gas from being entangled toward the center of the disc from the rim of the front seal 61 or the rim of the rear seal 63 only by flowing a small amount of cooling air into the front cooling passage 87 and into the rear cooling passage 95.

With the above configurations, the temperature of the entire turbine disc 55, especially the temperature of the rim of the front seal 61 and the rim of the rear seal 63 can sufficiently be lowered.

The cooling air from the outer portion of the combustor liner 31 in the combustor casing 29 flows into the communication cooling passage 99 through the through holes 89 and the through holes 101, and is discharged toward the main passage 7 from the blowout holes in the turbine moving blades 57 through the interiors of the turbine moving blades 57. With this configuration, the temperature of the turbine moving blades 57 can sufficiently be lowered.

According to the embodiment of the invention, it is possible to sufficiently suppressing the combustion gas from being entangled toward the center of the disc from the rim of the front seal 61 or the rim of the rear seal 63 only by flowing a small amount of cooling air into the front cooling passage 87 and the rear cooling passage 95. Therefore, the consumption amount of cooling air required for cooling the entire turbine disc 55 can be reduced, and the jet engine 1 can be operated in the high output state while suppressing the reduction of the energy efficiency of the jet engine 1.

Next, details of the jet engine 1 according to the present invention will be explained with reference to FIGS. 3A, 3B, 4A, 4B, 5, and 6.

Figure 5:
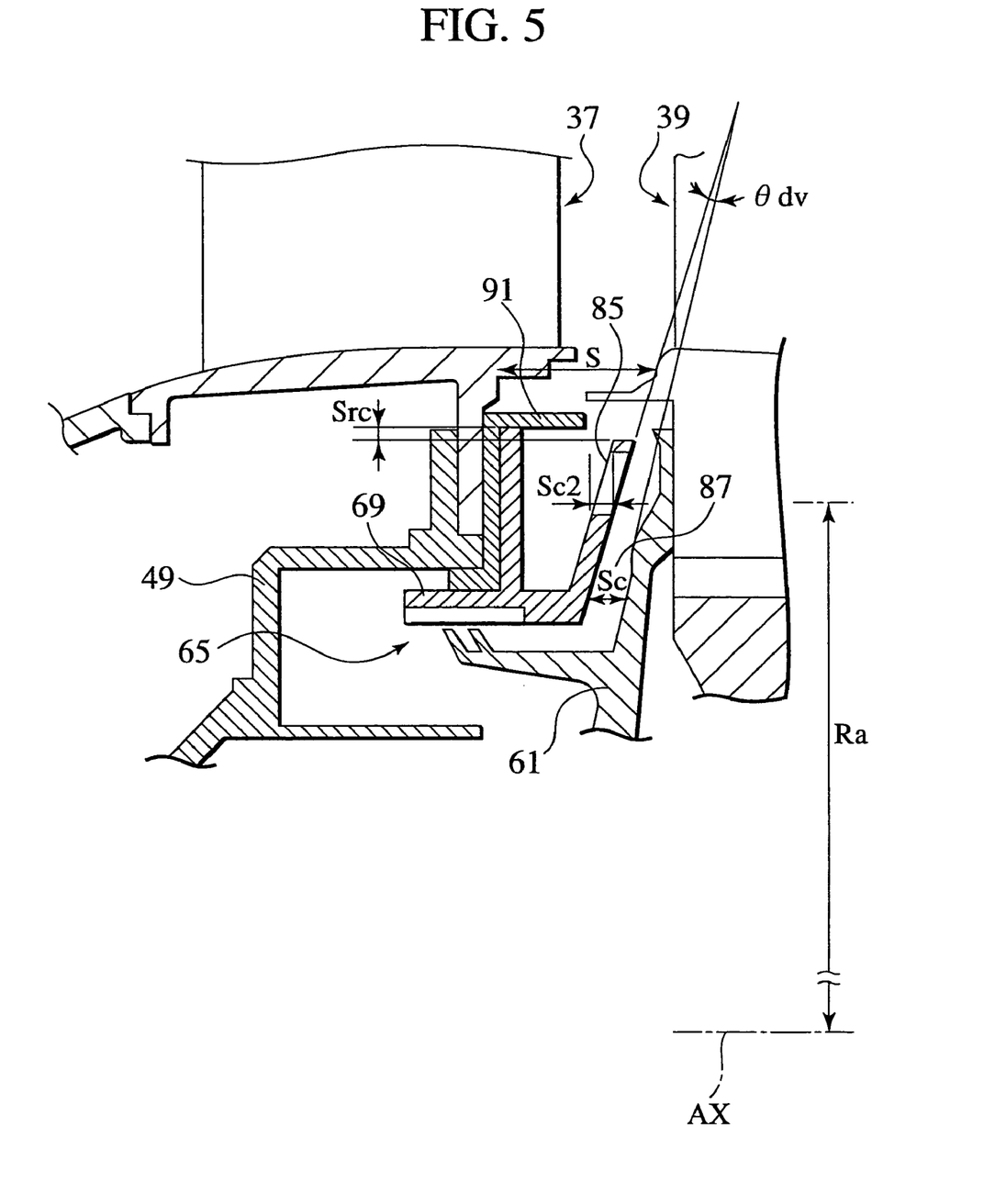
FIG. 5 is a partially enlarged view for explaining a comparison between sizes of various portions of the periphery of the rim of the front seal including the front cooling plate.

FIG. 5 is an enlarged view of a peripheral portion of the rim of the front seal 61 including the front cooling plate 85 shown in FIG. 1. In FIG. 5, a symbol S represents a distance between the high-pressure turbine rotor 39 (especially the front seal 61) and the high-pressure turbine stator 37 in the axial direction of the jet engine 1. When two or more high-pressure turbine rotors 39 are provided, the distance S is regarded as an average value of the distances. Symbol Sc represents a distance between the high-pressure turbine rotor 39 and the front cooling plate 85 in the axial direction of the jet engine 1. When two or more high-pressure turbine rotors 39 are provided, the distance Sc is regarded as an average value of the distances. Here, a proportion of these two factors is set as follows:

$Sc/S = 0.1$ to $0.2$.

In the drawing, symbol Sc2 represents a minimum distance between a tip end of the front flange 91 and a tip end of the front cooling plate 85 in the axial direction of the jet engine 1, and a proportion of the factors Sc2 and S is set as follows:

$Sc2/S \geq 0.2$.

In the drawing, symbol Src represents a minimum distance between the tip end of the front flange 91 and the tip end of the front cooling plate 85 in the radial direction of the jet engine 1, and symbol Ra represents a distance between a center axis AX of the jet engine 1 and a center position of a rim cavity in the radial direction of the jet engine 1. The proportional relationship of these two factors is set as follows:

$Src/Ra \leq 0.005$.

In the drawing, symbol θdv represents an angle (absolute value) formed between the high-pressure turbine rotor 39 (especially the front seal 61) and the front cooling plate 85 in a meridian plane of the jet engine 1, and the angle is set as follows:

$\theta dv \leq 10°$.

Figure 6:
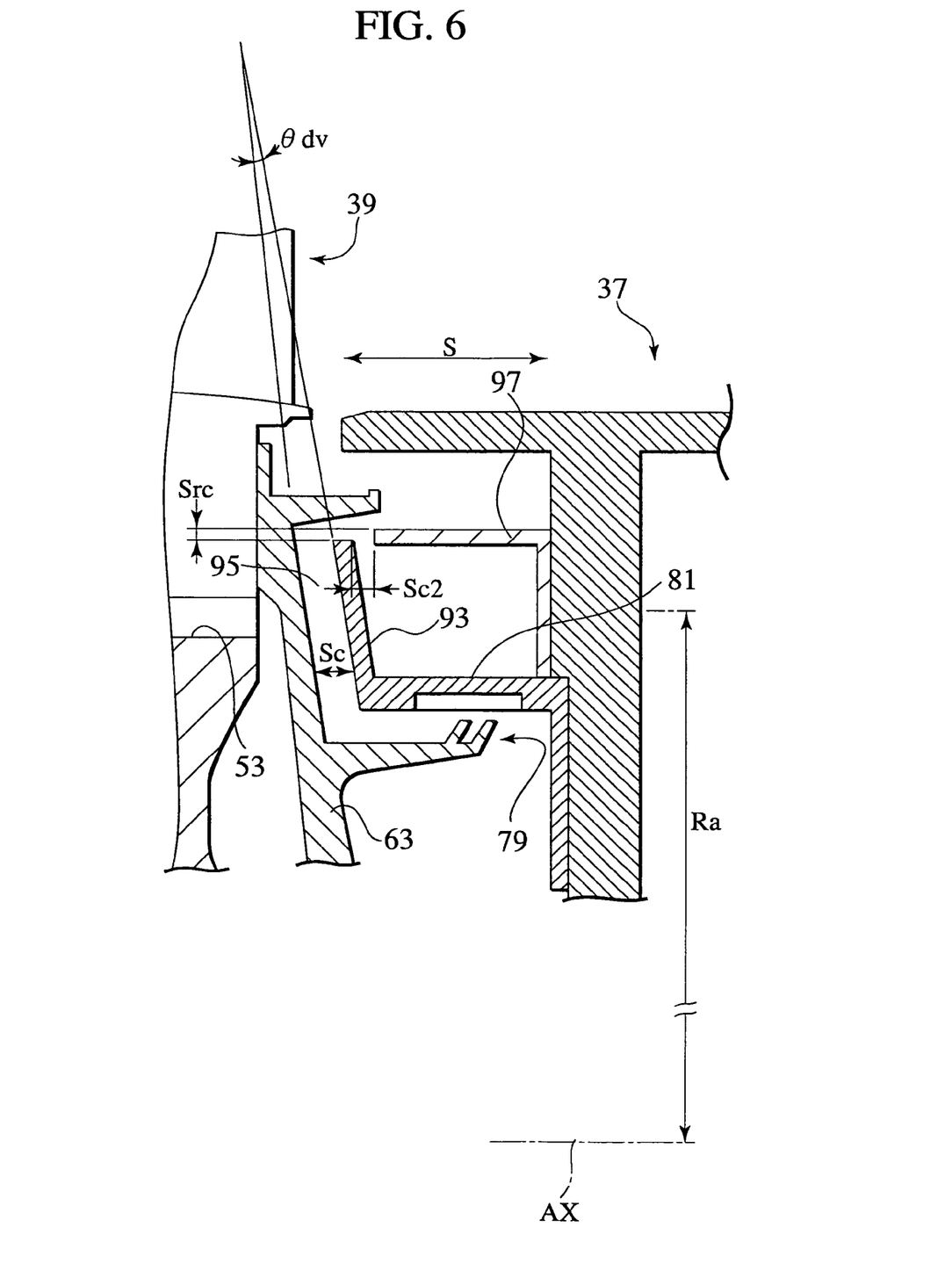
FIG. 6 is a partially enlarged view for explaining a comparison between sizes of various portions of the periphery of the rim of the rear seal including the rear cooling plate.

Next, FIG. 6 is an enlarged view of a peripheral portion of the rim of the rear seal 63 including the rear cooling plate 93. In FIG. 6, symbol Sc represents a distance between the high-pressure turbine rotor 39 (especially the rear seal 63) and the rear cooling plate 93 in the axial direction of the jet engine 1. When two or more high-pressure turbine rotors 39 are provided, the distance Sc is regarded as an average value of the distances. Symbol Sc2 represents a minimum distance between a tip end of the rear flange 97 and a tip end of the rear cooling plate 93 in the axial direction of the jet engine 1. Symbol Src represents a minimum distance between the tip end of the rear flange 97 and the tip end of the rear cooling plate 93 in the radial direction of the jet engine 1. Symbol θdv represents an angle (absolute value) formed between the high-pressure turbine rotor 39 (especially the rear seal 63) and the rear cooling plate 93 in the meridian plane of the jet engine 1.

Like the proportions and the numeric values of the factors of the distances of the rim circumstances of the front seal 61, the factors of the distances of the rim circumstances of the rear seal 63 are set as follows:

$Sc/S = 0.1$ to $0.2$ $Sc2/S \geq 0.2$ $Src/Ra \leq 0.005$, and $\theta dv \leq 10°$.

Next, a distribution state of dimensionless temperatures at the circumstances of the rim as measured according to the above configurations will be explained.

Figure 3A:
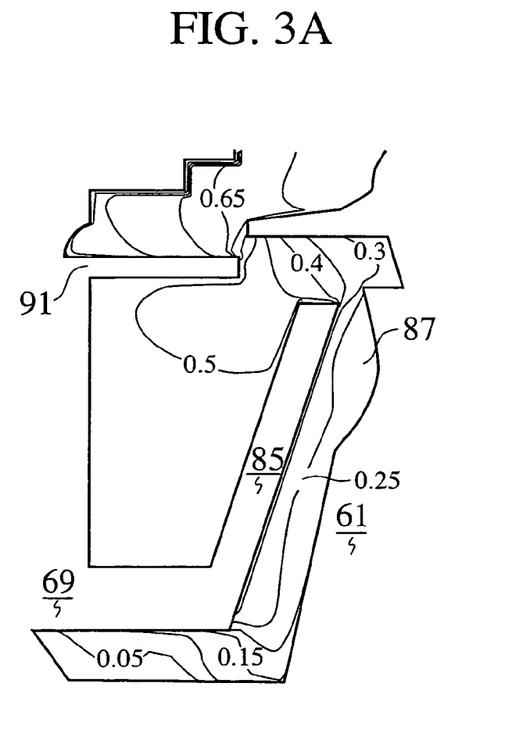
FIG. 3A shows a dimensionless temperature distribution of a periphery of a rim of a front seal when a front cooling plate is used.
Figure 3B:
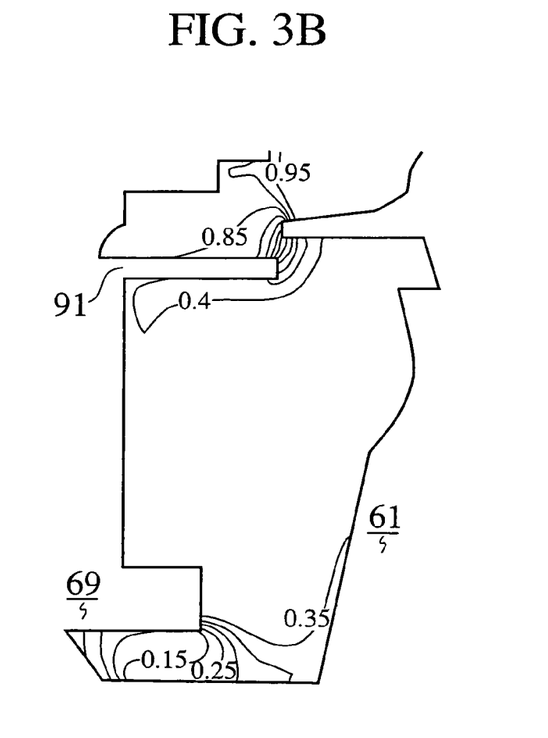
FIG. 3B shows a dimensionless temperature distribution of the periphery of the rim of the front seal when the front cooling plate is not used.
Figure 4A:
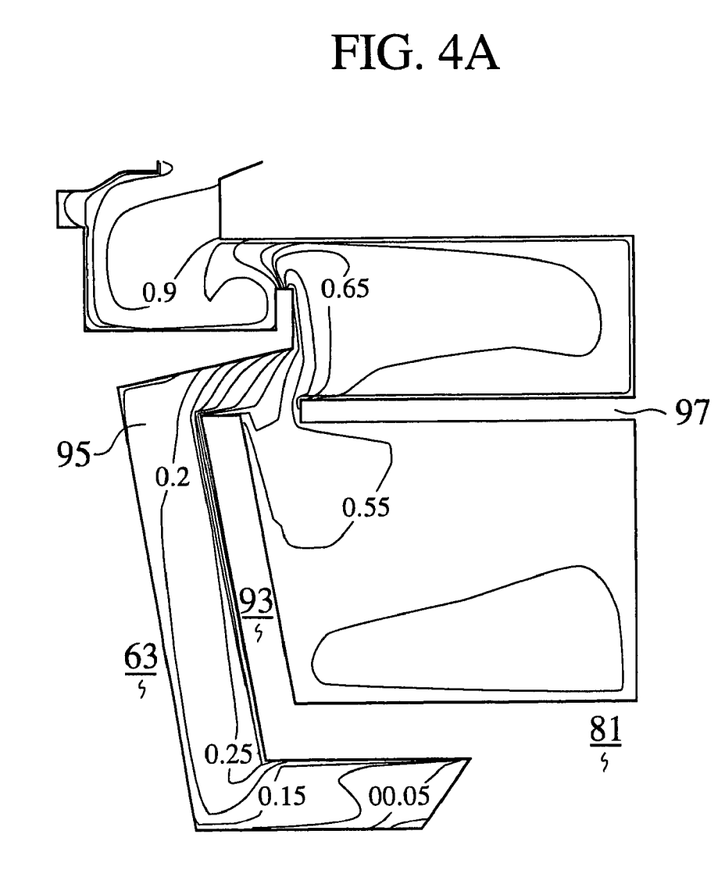
FIG. 4A shows a dimensionless temperature distribution of a periphery of a rim of a rear seal when a rear cooling plate is used.
Figure 4B:
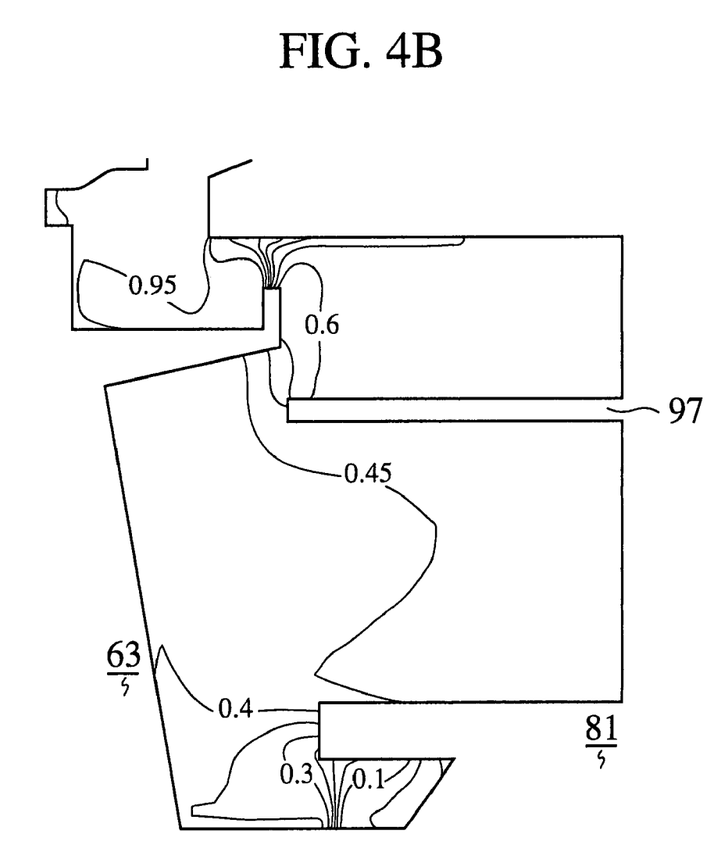
FIG. 4B shows a dimensionless temperature distribution of the periphery of the rim of the rear seal when the rear cooling plate is not used.

First, FIG. 3A shows a distribution state of dimensionless temperatures of the rim circumstances of the front seal when the front cooling plate is used, and FIG. 3B shows a distribution state of dimensionless temperatures of the rim circumstances of the front seal when the front cooling plate is not used. In addition, FIG. 4A shows a distribution state of dimensionless temperatures of the rim circumstances of the rear seal when the rear cooling plate is used, and FIG. 4B shows a distribution state of dimensionless temperatures of the rim circumstances of the rear seal when the rear cooling plate is not used.

As shown in FIGS. 3A and 3B, the temperature of the rim circumstances of the front seal 61 was largely reduced if the front cooling plate 85 was used. Similarly, as shown in FIGS. 4A and 4B, the temperature of the rim circumstances of the rear seal 63 was largely reduced if the rear cooling plate 93 was used.

Here, the dimensionless temperature is obtained by $$T/U,$$

wherein

T=air temperature at measuring position—air temperature of cooling air source, and U=combustion gas temperature—air temperature of cooling air source.

Therefore, if the dimensionless temperature is 1 (T/U=1), this means that the air temperature at this point is the same as the combustion gas temperature. If the dimensionless temperature is 0 (T/U=0), this means that the air temperature at this point is the same as the air temperature of the cooling air source.

The temperature of each portion was obtained using commercial fluid analyzing software.

The entire contents of Japanese Patent Application No. 2003-028128 (filed on Feb. 5, 2003) are incorporated in this specification by reference.

The present invention is not limited to the embodiment described above, and the invention can be carried out in various modes by appropriately changing the embodiment.

The invention claimed is:

1. A gas turbine engine, comprising:
a compressor compressing air;
a combustor to burn fuel in the compressed air compressed by the compressor;
a turbine operated by expansion of combustion gas from the combustor, the turbine operating the compressor in association; and
a cooling plate provided on a stationary section in the vicinity of a turbine disc in the turbine, the cooling plate extending in a radial direction of the turbine disc so as to be opposed to a side surface of a rim of the turbine disc in a manner such that the opposing surface of the cooling plate is close to the side surface of the rim, wherein
a cooling passage is formed between the opposing surface of the cooling plate and the side surface of the rim wherein a portion of the compressed air can flow as cooling air through the cooling passage, wherein the turbine includes a stator and a rotor and wherein, when a distance between said turbine stator and said turbine rotor both constituting the turbine in an axial direction thereof is defined as S and a distance between the turbine rotor and the cooling plate in the axial direction of the turbine is defined as Sc, the relation between the distances is established as:

$$Sc/S=0.1 \text{ to } 0.2.$$

2. The gas turbine engine according to claim 1, wherein the opposing surface of the cooling plate is substantially in parallel to the side surface of the rim.

3. The gas turbine engine according to claim 1, further comprising:
a flange which is provided on the turbine stator and which extends to approach a tip end of the cooling plate; wherein when a minimum distance between a tip end of the flange and the tip end of the cooling plate is defined as Sc2, the following relation between the distances is established as:

$$Sc2/S \geq 0.2.$$

4. The gas turbine engine according to claim 3, wherein when a minimum distance between the tip end of the flange and the tip end of the cooling plate in a radial direction of the turbine is defined as Src, and a distance between a center of the rim of the turbine disc and a center of the gas turbine engine is defined as Ra, the following relation between the distances is established as:

$$Src/Ra \geq 0.005.$$

5. The gas turbine engine according to claim 1, wherein an angle formed between the turbine rotor and the cooling plate in a meridian plane of the gas turbine engine is 10° or less.

6. A gas turbine engine, comprising:
a compressor compressing air;
a combustor to burn fuel in the compressed air compressed by the compressor;
a turbine operated by expansion of combustion gas from the combustor, the turbine operating the compressor in association;
a cooling plate provided on a front stationary section in the vicinity of a turbine disc in the turbine, the cooling plate extending in a radial direction of the turbine disc so as to be opposed to a front surface of a rim of the turbine disc in a manner such that the opposing surface of the cooling plate is close to the front surface of the rim;
a front cooling passage formed between the opposing surface of the front cooling plate and the front surface of the rim wherein a portion of compressed air as cooling air can flow through the front cooling passage;
a rear cooling plate provided on a rear stationary section in the vicinity of a rear side of the turbine disc, the rear cooling plate extending in a radial direction of the disc so as to be opposed to a rear surface of the rim in a manner such that the opposing surface of the rear cooling plate is close to the rear surface of the rim; and
a rear cooling passage formed between the opposing surface of the rear cooling plate and the rear surface of the rim wherein a portion of the compressed air as the cooling air can flow through the rear cooling passage, wherein the turbine includes a stator and a rotor and wherein, when a distance between said turbine stator and said turbine rotor both constituting the turbine in an axial direction thereof is defined as S and a distance between the turbine rotor and the cooling plate in the axial direction of the turbine is defined as Sc, the relation between the distances is established as:

$$Sc/S=0.1 \text{ to } 0.2.$$

7. The gas turbine engine according to claim 6, wherein the opposing surface of the front cooling plate is substantially in parallel to the front surface of the rim, and the opposing surface of the rear cooling plate is substantially in parallel to the rear surface of the rim.

* * * * *

UNITED STATES PATENT AND TRADEMARK OFFICE
CERTIFICATE OF CORRECTION

PATENT NO. : 7,037,067 B2　　　　　　　　　　　　　　　　　　　Page 1 of 1
APPLICATION NO. : 10/508842
DATED : May 2, 2006
INVENTOR(S) : Okita et al.

It is certified that error appears in the above-identified patent and that said Letters Patent is hereby corrected as shown below:

On the title page, Item (73), the Assignee information is incorrect. Item (73) should read:

-- (73)　Assignee:　Ishikawajima-Harima Heavy Industries Co., Ltd., Tokyo (JP)　--

Signed and Sealed this

Eighth Day of August, 2006

JON W. DUDAS
*Director of the United States Patent and Trademark Office*